United States Patent
Simmons

(10) Patent No.: US 12,534,932 B2
(45) Date of Patent: Jan. 27, 2026

(54) POST SOCKET

(71) Applicant: Simbars (UK) Limited, Bristol (GB)

(72) Inventor: Martin Simmons, Bristol (GB)

(73) Assignee: SIMBARS (UK) LTD, Bristol (GB)

( * ) Notice: Subject to any disclaimer, the term of this patent is extended or adjusted under 35 U.S.C. 154(b) by 0 days.

(21) Appl. No.: 18/756,435

(22) Filed: Jun. 27, 2024

(65) Prior Publication Data

US 2025/0003247 A1    Jan. 2, 2025

(30) Foreign Application Priority Data

Jun. 28, 2023 (GB) .................................... 2309762

(51) Int. Cl.
*E04H 12/22* (2006.01)
*E01F 9/685* (2016.01)

(52) U.S. Cl.
CPC ......... *E04H 12/2269* (2013.01); *E01F 9/685* (2016.02); *E04H 12/2276* (2013.01)

(58) Field of Classification Search
CPC .. E04H 12/2269; E04H 12/2276; E01F 9/685; F16M 2200/027; F16M 2200/022
USPC ............................................................ 52/298
See application file for complete search history.

(56) References Cited

U.S. PATENT DOCUMENTS

| | | | | |
|---|---|---|---|---|
| 1,918,519 A | * | 7/1933 | Clements ................ | A47L 9/325 |
| | | | | 403/109.5 |
| 3,604,734 A | * | 9/1971 | Friedman ................ | A47B 9/08 |
| | | | | 403/109.5 |
| 3,805,468 A | * | 4/1974 | Granstrom .............. | E02D 27/42 |
| | | | | 403/374.2 |
| 4,059,934 A | * | 11/1977 | Hayamizu ............. | A63B 71/028 |
| | | | | 52/297 |
| 4,430,017 A | * | 2/1984 | Stefancich ........... | F16M 11/245 |
| | | | | 403/109.5 |

(Continued)

FOREIGN PATENT DOCUMENTS

| | | | | |
|---|---|---|---|---|
| DE | 102018119029 A1 | * | 2/2020 | .......... E04F 11/1814 |
| EP | 0208095 B1 | * | 3/1990 | ............... B63H 8/22 |

(Continued)

OTHER PUBLICATIONS

UKIPO, Search Report in corresponding GB application 2309762.9, Jan. 4, 2024.

*Primary Examiner* — Taylor Morris
(74) *Attorney, Agent, or Firm* — Alley IP

(57) ABSTRACT

Post sockets to support information signs and street/traffic lighting are known. Instead of securing a post directly into the ground, post sockets may be used. However, it may be difficult to access the post socket's actuation mechanism, or apply a sufficient clamping force via the actuation mechanisms. There is provided a post socket comprising a compressible sleeve within a housing, the sleeve comprising a grip section adjustably moveable between a first grip position and second grip position, the second grip position having a smaller internal width than the first grip position, a lever arm rotatably attached to the housing, and an actuator to rotate the lever arm around a first pivot point. The grip section is rotatably attached to the lever arm at a second pivot point, to move the grip section from the first to the second grip position, to grip and retain a post within the sleeve.

18 Claims, 4 Drawing Sheets

(56) References Cited

U.S. PATENT DOCUMENTS

| | | | | | |
|---|---|---|---|---|---|
| 4,528,768 | A | * | 7/1985 | Anderson | A01K 97/10 403/374.5 |
| 4,715,488 | A | * | 12/1987 | Hewitt | B65G 13/12 403/104 |
| 4,926,592 | A | * | 5/1990 | Nehls | E01F 9/685 40/607.05 |
| 5,895,169 | A | * | 4/1999 | Holm | E01F 9/685 248/156 |
| 6,290,192 | B1 | * | 9/2001 | Messerli | A61M 5/1415 5/503.1 |
| 7,249,910 | B2 | * | 7/2007 | Eckert | E01F 9/629 404/9 |
| 7,543,415 | B2 | * | 6/2009 | Svendsen | E04H 4/14 52/298 |
| 8,257,231 | B2 | * | 9/2012 | Bingham, Jr. | A63B 21/225 403/109.5 |
| 9,109,616 | B1 | * | 8/2015 | Ballentine | F16B 7/1454 |
| 9,777,456 | B1 | * | 10/2017 | Spiro | E04H 12/2284 |
| 10,598,198 | B2 | * | 3/2020 | Brice | A63B 5/10 |
| 10,633,818 | B2 | * | 4/2020 | Spiro | E04H 12/2292 |
| 10,837,193 | B2 | * | 11/2020 | Andrews | F16M 11/046 |
| 2020/0190843 | A1 | * | 6/2020 | Simmons | E04H 12/2269 |

FOREIGN PATENT DOCUMENTS

| | | | | |
|---|---|---|---|---|
| EP | 2110478 | | 10/2009 | |
| GB | 2522121 | | 7/2015 | |
| GB | 2576529 | A * | 2/2020 | E01F 13/026 |
| GB | 2579831 | A * | 7/2020 | E01F 9/685 |
| KR | 200365809 | Y1 * | 10/2004 | E04H 12/2269 |
| WO | 2016/110703 | | 7/2016 | |

\* cited by examiner

POST SOCKET

RELATED APPLICATIONS

This application claims priority under 35 U.S.C. § 119 to GB Application 2309762.9, filed Jun. 28, 2023. This GB application is incorporated by reference herein in its entirety.

FIELD

The present invention relates generally to a socket for securing a post, and a method of securing a post within a socket, and finds particular, although not exclusive, utility in releasably securing a post within the ground.

BACKGROUND

It is known to provide posts and/or poles adjacent to roads, buildings, or other infrastructure to support information signs, overhead/street lighting, and/or traffic lights. Passive safety poles are also known, which may be of sufficient strength to support signs and/or lighting, but crumple when hit by a vehicle as a safety measure (to prevent the vehicle stopping abruptly, thereby reducing injury to passengers). It is also known to provide bollards for protecting pedestrians, buildings, or other infrastructure from colliding vehicles.

Traditionally, to install a post or bollard a hole is excavated, an end of the post is positioned within the hole, and the hole is then back filled with material such as concrete to retain the post within the hole. However, if the post becomes damaged, such as if a vehicle collides with the post, the post must be replaced. This is particularly necessary for passive safety posts which are designed to crumple on impact. To replace a post installed in the traditional manner explained above, the post must be freed from the ground by releasing it from, or excavating, the back-filled material. This is generally time consuming and relatively costly.

A post socket may be used to reduce the time and cost of replacing a damaged post. This is because a post socket is a device that is buried in the ground, and comprises a mechanism capable of releasably clamping the end of a post. In this way, a post socket enables a damaged post to be removed from the ground, and a new post to be installed in the same post socket.

A post socket should provide sufficient force to a post when clamped to prevent the post from being twisted in the socket, or removed from the socket. In this way, a relatively great force is required to retain the post within the socket. Known post sockets include bolts driven into the side of the post as a means of securing the post. This applies the clamping force only through the area of the end of the bolt which may damage the posts and potentially weaken them.

To reduce the risk of damage caused by driving bolts into the side of the post, post sockets comprising compressible sleeves are also known, which apply the clamping force over a greater area. However, known compressible sleeves may not be capable of providing a sufficient clamping force to prevent twisting and/or removal of the post from the post socket.

SUMMARY

Accordingly, there is a desire for an improved post socket.

In a first aspect, the present invention provides a post socket comprising: a housing; a compressible sleeve within the housing, the sleeve arranged to receive at least a portion of a post therein, wherein the sleeve comprises a grip section, the grip section being adjustably moveable between a first grip position in which the sleeve has a first internal width and a second grip position in which the sleeve has a second internal width, the second internal width being less than the first internal width; a lever arm rotatably attached to the housing at a first pivot point, the lever arm configured to rotate in a working plane, the working plane extending radially from the compressible sleeve's longitudinal axis, and parallel to the compressible sleeve's longitudinal axis; and an actuator configured to rotate the lever arm around the first pivot point; wherein the grip section is rotatably attached to the lever arm at a second pivot point, the lever arm arranged to move the grip section, from the first grip position to the second grip position, to grip and thus retain at least a portion of a post within the sleeve.

In this way, the post socket may secure the post using only a compressible sleeve to sufficiently prevent twisting or removal of the post. As such, the post is sufficiently secured in the post socket without the need of a bolt driven into the post's sides, thereby alleviating the risk of damaging or potentially weakening the post.

Furthermore, by rotatably attaching the grip section to the lever arm, the surface of the grip section may remain parallel to the surface of the post during the securing operation, such that the gripping force may be applied evenly across the entire grip section as the lever arm rotates. This reduces the risk of damage to the post because the full clamping force is not through a small area, such as only the edge of the grip section. Moreover, by enabling the full surface of the grip section to contact the post, a greater frictional force may be provided between the surface of the post and the surface of the post socket, further preventing removal of the post.

Use of the lever arm may also provide a 2:1 mechanical advantage, whereby in use, for every 1 kN of force applied by the actuator to the lever arm, 2 kN of force may be applied to the post by the grip section. However, other ratios are also contemplated, for example 3:1, or 4:1. This allows for a user to apply substantially more force onto the post with relatively simple hand tools.

The longitudinal axis of the compressible sleeve may be the axis extending along the longest length of the compressible sleeve, which in use may be in a vertical orientation. As such, the longitudinal axis of the compressible sleeve, in use, may be parallel to the length of the post when inserted into the sleeve. The cross-section of the compressible sleeve, in a plane perpendicular to its longitudinal axis, may be substantially circular, oblong, square, or rectangular. Other shapes are also contemplated, for example hexagonal or octagonal. It will be appreciated that if, for example, the compressible sleeve has a square cross-section, the longitudinal axis may extend through the centre point of the square cross-section. As such, the working plane may extend in a radial direction originating from the longitudinal axis extending through the centre point of the square cross-section.

The compressible sleeve may be comprised of metal.

The lever arm may comprise a substantially linear bar extending from the first pivot point to a distal end of the lever arm. The longitudinal axis of the lever arm may be the axis extending from the first pivot point to the distal end of the lever arm. Alternatively, the lever arm may comprise a curved bar extending from the first pivot point to a distal end of the lever arm. In this instance, the longitudinal axis may be the axis extending through the chord of the curve, from the first pivot point to the distal end of the lever arm.

The actuator may comprise any means for providing motion to the lever arm such that it rotates around the first pivot point. For example, the actuator may comprise a means for applying a linear force to a surface of the lever arm, which may result in a rotational force of the lever arm around the first pivot point. Alternatively, the actuator may comprise a means for applying a rotational force at the first pivot point such that it outputs a rotational force to the lever arm.

The second pivot point may be located on the lever arm substantially equidistant from the distal end and the first pivot point. Alternatively, the second pivot point may be located at any other point on the lever arm between the distal end of the lever arm and the first pivot point, for example a point two thirds of the length of the lever arm taken from the first pivot point, or a point three quarters of the of the length of the lever arm taken from the first pivot point. The grip section may be pivotally attached to the lever arm at the second pivot point via a second pin. The second pin's axis of rotation may be perpendicular to the working plane, and may be substantially horizontal in use.

The actuator may comprise a projection extending from the housing, and an operator moveable relative to the projection, wherein the operator may be movable in a first direction to rotate the lever arm around the first pivot point from a retracted position to an engaged position.

The operator may be moveable relative to the projection such that the operator is moveable linearly in the direction in which the projection extends from the housing. Additionally or alternatively, the operator may be rotatably moveable relative to the projection such that the direction in which the projection extends from the housing defines a rotational axis of the operator.

The actuator may utilise the reaction force from the housing when applying a rotational force to the lever arm. In particular, the actuator may effectively 'push against' the housing.

The projection may extend parallel to the working plane. Alternatively, the projection may extend offset from the working plane. The operator may be moveable in a direction parallel to the working plane. Alternatively, the operator may be movable in a direction offset from the working plane.

The projection may be one of a first threaded bolt or a nut, and the operator may be the other of a first threaded bolt or a nut.

In this way, a user may simply rotate a nut relative to a first threaded bolt, or a first threaded bolt relative to a nut, to rotate the lever arm relative to the first pivot point. This may be achieved with the use of readily available tools, such as a spanner or wrench, and consequently may not require specific tools or complex movements.

The first threaded bolt may be attachable to the housing such that rotation of the bolt is prevented. For example, the first threaded bolt may be welded to the housing.

Alternatively, the nut may be attachable to the housing such that rotation of the nut is prevented. For example, the nut may be welded to the housing.

When the lever arm is in the retracted position the grip section may be in the first grip position, and when the lever arm is in the engaged position the grip section may be in the second grip position. This is because the grip section is connected to the lever arm, such that movement of the lever arm causes the grip section to move with it.

In use, when a post is inserted into the compressible sleeve, the actuator may move the lever arm towards the post, which may cause the grip section to also move towards the post. During this movement, the grip section may contact the post. When the grip section contacts the post, the grip section may rotate relative to the lever arm around the second pivot point such that the longitudinal axis of the grip section may become parallel to the longitudinal axis of the post. This is because the post may provide a surface against which the grip section is pressed, such that once the grip section is flush against the post, relative rotation of the longitudinal axis of the grip section and the longitudinal axis of the post is inhibited. As the rotation of the lever arm continues, so may the rotation of the grip section relative to the lever arm, such that the longitudinal axis of the grip section remains parallel to the longitudinal axis of the post. Again, this is because when the grip section is flush against the surface of the post, the relative rotation of the longitudinal axis of the grip section and the longitudinal axis of the post is inhibited.

The post socket may comprise a stop either extending from the lever arm towards the grip section, or extending from the grip section towards the lever arm, wherein, in use, with the stop being in contact with the lever arm and the grip section, further rotation of the grip section relative to the lever arm around the second pivot point is prevented with the grip section in contact with a post inserted within the compressible sleeve.

In this way, at the point the stop contacts both the lever arm and the grip section, a user may feel an immediate increase in resistance when operating the operator, indicating that the compressible sleeve is applying a sufficient clamping force on the post to secure it in place. This may prevent excessive force being applied to the post, which may cause damage or deformation of the post. In particular, at the point the stop contacts both the lever arm and the grip section, the force exerted by the actuator may no longer contribute to a moment applied around the first pivot point, but may instead apply a direct force on the grip section. As such, a greater resistance may be felt by a user applying a direct force from the actuator to the grip section, rather than applying a force to the lever arm to produce a moment around the first pivot point.

The stop may be extendable and/or retractable relative to the grip section and/or lever arm. In this way, the length of the stop may be adjustable. In use when a post is received within the compressible sleeve, an adjustable stop may enable a user to set a threshold distance the lever arm may travel before the stop contacts both the lever arm and grip section, thereby setting the point at which a higher resistance is felt by a user, and indicating that a sufficient clamping force has been applied to the post by the compressible sleeve. Hence, crushing, or otherwise damaging, the post may be prevented.

The stop may be extendable through an aperture within the lever arm. The stop may be a second threaded bolt. The second threaded bolt may be attachable to the operator. In the case of the operator being a nut, the second threaded bolt may be engageable with a second end of the nut, opposite to the end engaged with the first threaded bolt. In the case of the operator being a first threaded bolt, the second threaded bolt may be engageable with the head of the first threaded bolt.

Alternatively, the second threaded bolt may be attachable to the lever arm or the grip section. In this way, the stop may be engageable with the lever arm, grip section, or operator via a corresponding threaded hole, and may be easily adjustable via rotation of the second threaded bolt.

The second threaded bolt may be securable within the nut via a grub screw. In this way, after the extension of the second threaded bolt relative to the nut has been set, the grub screw may prevent rotation of the second threaded bolt relative to the nut, such that the extension of the second threaded bolt remains constant. This may, for example, reduce the likelihood of the second threaded bolt rotating due to the frictional contact of the head of the second threaded bolt and the surface of the grip section.

The projection may alternatively comprise a first linkage and a second linkage, wherein a first end of the first linkage is pivotally connected to a first end of the second linkage. A second end of the first linkage may be pivotally connected to a lever arm bracket, wherein the lever arm bracket may be connected to the lever arm. A second end of the second linkage may be pivotally connected to a housing bracket, wherein the housing bracket is connected to the housing.

The operator may comprise a screw extending through the pivotal connection of the first end of the first linkage and first end of the second linkage, in a direction perpendicular the rotational axis of the pivotal connection. In this way, rotation of the screw in a first direction may rotate the first and second linkages such that the angle between the linkages increases, thereby increasing the length of the projection. Rotation in a second direction may rotate the first and second linkages such that the angle between the linkages reduces, thereby reducing the length of the projection. Increasing the length of the projection in this way may provide a force on the lever arm, preferably the distal end of the lever arm, which in turn may result in rotation of the lever arm around the first pivot point. Reducing the length of the projection may remove a force exerted on the lever arm.

Due to the grip section being rotatable around the second pivot point, in use when a post is inserted in the post socket, the grip section's longitudinal axis may remain parallel to the post's longitudinal axis during movement of the grip section from the first grip position to the second grip position. This is because the grip section may be pressed flush against the surface of the post, such that relative rotation of the longitudinal axis of the grip section and the longitudinal axis of the post is inhibited.

In this way, the gripping force may be applied evenly across the grip section to the post as the lever arm rotates.

The grip section may comprise a concave surface, and two grip section sides extending away from the concave surface in a direction parallel to the working plane. The cross-section of the grip section in a plane perpendicular to the grip section's longitudinal axis may therefore be substantially M-shape. The curvature of the concave surface may, in use, correspond to the curvature of the post received within the compressible sleeve.

Alternatively, the grip section may comprise a planar surface, wherein the two grip section sides extend away from the planar surface in a direction parallel to the working plane. This may be used, for example, when installing a post having a square cross section. Other shaped surfaces are also contemplated to account for different shaped posts. For example, the surface may comprise a shape corresponding to a portion of a hexagonal post.

The lever arm may comprise a planar face perpendicular to the working plane, and two lever arm sides extending away from the planar face in a direction parallel to the working plane.

The rotational axis of the second pivot point may extend through the two grip section sides and the two lever arm sides. An aperture may extend through each of the two grip section sides and two lever arm sides. A second pin may extend through the aperture, such that the grip section and/or lever arm may rotate around the second pin.

The actuator may comprise a locking mechanism configured to prevent actuation of the actuator when the locking mechanism is in a locked state. In this way, the risk of the actuator being tampered with is reduced.

The locking mechanism may comprise a means for restricting the movement of the actuator. Alternatively, the locking mechanism may comprise a means for reducing the accessibility of the actuator. For example, reducing the accessibility may comprise covering the actuator.

The locking mechanism may comprise a plate arranged concentrically around the perimeter of the nut, the plate being securable to the nut and the lever arm such that in use, rotation of the plate and the nut around the rotational axis of the nut is prevented.

The plate may comprise a first hole having a cross-sectional shape corresponding substantially to the shape and size of the nut. For example, the nut may be hexagonal, and the hole may be hexagonal. The plate may be releasably attachable to the nut. For example, the plate may slide onto the nut, in use.

The plate may comprise at least one second hole. The lever arm may comprise a loop. The plate may be securable to the housing via a rod extending through the second hole and the loop, thereby preventing relative movement between the plate and the lever arm. Alternatively, the shackle of a padlock may extend through the second hole and the loop. As a further alternative, the loop may be connected to the housing, such that the locking mechanism functions by preventing relative movement between the plate and the housing.

The locking mechanism may comprise a U-shape sheath, a flange extending perpendicularly from a side of the U-shape sheath, a ring extending from the housing, and a C-lock, wherein, in use, the sheath is configured to cover the actuator, and the C-lock is arrangeable adjacent to the flange and configured to engage with the ring such that removal of the sheath from the housing is prevented. In this way, access to the actuator mechanism may be restricted, reducing the risk of tampering.

The sheath covering the actuator may comprise the sheath only covering the operator. For example, the sheath may only cover the nut.

The compressible sleeve may comprise a cradle stationary relative to the housing, the cradle having a concave face opposed to the grip section. The cradle may be a section of the housing.

The post socket may be arranged to receive and secure other fixtures as well as posts, such that different types of street furniture may be secured to the ground. Types of street furniture include, for example, electric vehicle charging cabinets.

The post socket may comprise a support bracket. The support bracket may comprise a support plate, and a post section extending perpendicularly from the support plate, wherein, in use, the post section of the support bracket may be arranged to be securable within the compressible sleeve of the post socket. In this way, engaging the lever arm may grip the post section, thereby securing the support bracket, and retracting the lever arm may release the post section, thereby releasing the support bracket.

The support bracket may be for securing an electric vehicle charging cabinet to the ground, in use. The width of the post section may be less than the width of the first internal width of the compressible sleeve. In use, the support bracket may be secured such that the support plate is horizontal. An electric vehicle charging cabinet may be fixable to the support plate. An orifice may extend through the support plate. The post section may be hollow. The longitudinal axis of the post section may extend through the centre point of the orifice.

A duct may be attachable to the post socket. In particular, the duct may be attachable to the housing such that an opening of the duct may be arranged concentrically with the longitudinal axis of the compressible sleeve.

In this way, with an electric vehicle charging cabinet fixed to the support plate, electric cables associated with the electric vehicle charging cabinet may extend from the electric vehicle charging cabinet, through the orifice of the support plate, through the post section of the support bracket, and through the opening of the duct and into the duct itself. The cables may then be connected to an external electrical energy supply.

In a second aspect, the invention provides a method of installing a post, the method comprising the steps of: providing the post socket of any preceding claim, with the grip section configured to be in the first grip position; inserting a post within the compressible sleeve; operating the actuator to rotate the lever arm around the first pivot point such that the grip section moves to the second grip position, thereby reducing the width of the compressible sleeve, and securing the post within the post socket.

Inserting the post within the compressible sleeve may comprise inserting the post such that in use it extends vertically from the compressible sleeve.

Operating the actuator may comprise use of a spanner by the user to apply a rotational force to the actuator. The rotational force may be converted to a linear force that acts on the lever arm. This in turn may be provide a rotational movement of the lever arm around the first pivot point.

In a third aspect, there is provided a system for securing a post, the system comprising: a post; and a post socket comprising: a housing; a compressible sleeve within the housing, the sleeve arranged to receive at least a portion of the post therein, wherein the sleeve comprises a grip section, the grip section being adjustably moveable between a first grip position in which the sleeve has a first internal width and a second grip position in which the sleeve has a second internal width, the second internal width being less than the first internal width; a lever arm rotatably attached to the housing at a first pivot point, the lever arm configured to rotate in a working plane, the working plane extending radially from the compressible sleeve's longitudinal axis, and parallel to the compressible sleeve's longitudinal axis; and an actuator configured to rotate the lever arm around the first pivot point; wherein the grip section is rotatably attached to the lever arm at a second pivot point, the lever arm arranged to move the grip section, from the first grip position to the second grip position, to grip and thus retain at least a portion of the post within the sleeve.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
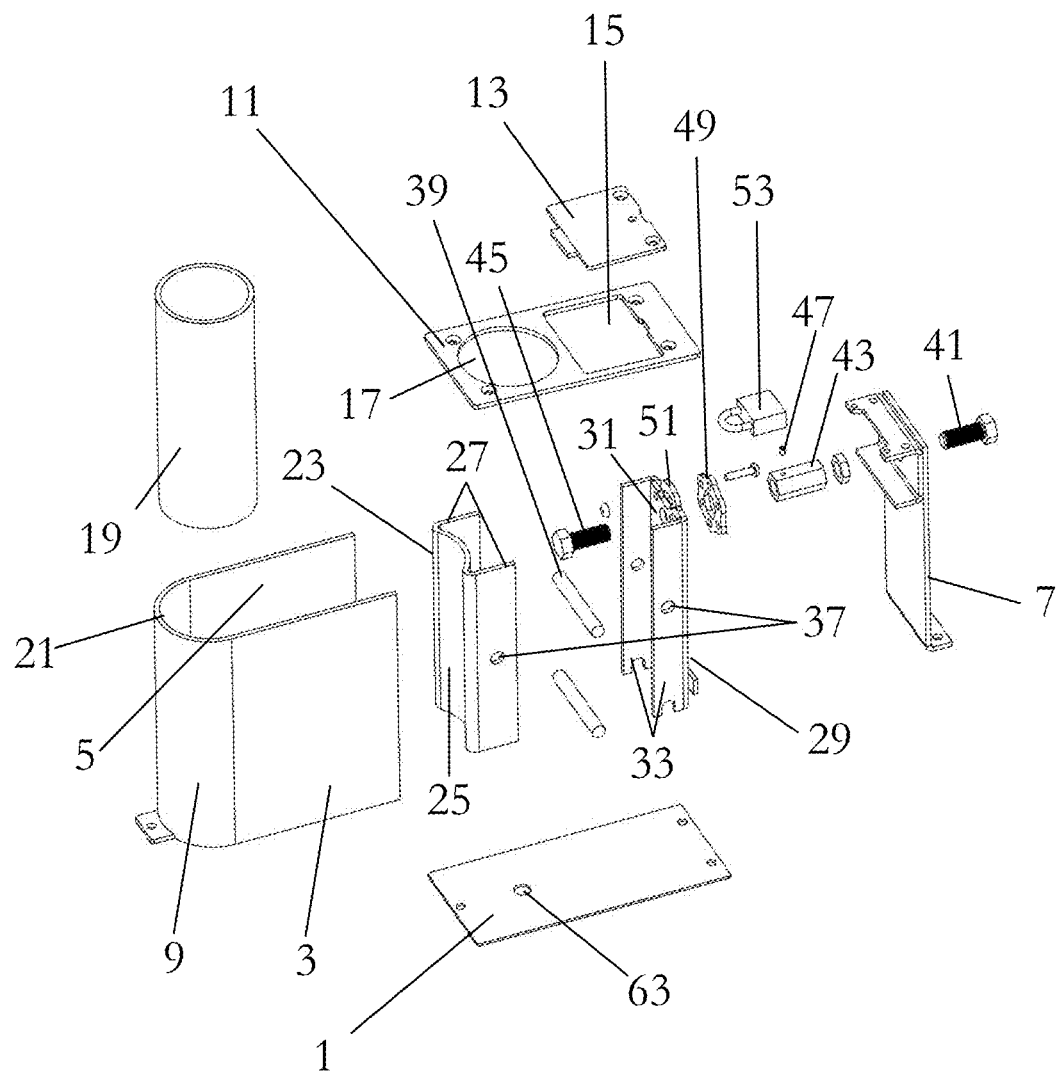
FIG. 1 is an exploded view of a post socket.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is an exploded view of a post socket. An elevational view of the side of the post socket in an assembled form is shown without the sidewalls in FIGS. 2 and 3. The post socket includes a housing comprising a horizontal base plate 1, two sidewalls 3, 5, a back wall 7, and a front wall 9. The walls 3, 5, 7, 9 all extend vertically from the horizontal base plate 1. A lid 11 is also shown that in use extends horizontally across the upper edges of the walls 3, 5, 7, and 9. In this way, the housing defines a hollow box. The walls 3, 5, 7, and 9 may be integrally formed, or may be formed of individual parts joined together. The walls 3, 5, 7, and 9 may be comprised of metal.

The lid 11 comprises a removable access panel 13 to cover an access hole 15 extending through the lid 11. The access hole 15 enables a user to access the actuator, and the access panel 13 enables a user to prevent unauthorised access to the actuator. A post hole 17 also extends through the lid 11. In use, with the lid 11 attached to the upper edges of the walls 3, 5, 7, and 9, a post 19 may be inserted through the post hole 17 and into a compressible sleeve.

The compressible sleeve is formed of a cradle 21 and a grip section 23. The cradle 21 is formed by the front wall 9, which has a curved, concave inner surface. However, it will be appreciated that the cradle 21 may not be integrally formed with the front wall 9. For example, the cradle may instead be a separate wall extending between the sidewalls 3, 5.

The grip section 23 is arranged between the front wall 9 and the back wall 7. The grip section 23 is an elongate bar including a grip face 25, and two grip section sides 27 extend from the edges of the grip face 25 away from the cradle 21, in use. The grip section sides 27 are parallel to the sidewalls 3, 5. The grip face 25 is arranged opposite to the curve of the cradle 21, in use. The grip section 23 is further arranged such that its longitudinal axis extends vertically, in use. The grip face 25 is curved.

In use, the radius of curvature of the cradle 21 and the radius of curvature of the grip face 25 may be configured to be the same as the radius of curvature of the post. It will be appreciated that if the shape of the post's cross-section is not circular, the cradle 21 and the grip face 25 may be configured to correspond to the post's non-circular cross-section. For example, if the post is square, the cradle 21 may comprise a planar surface, and the grip face 25 may also be planar. If the post is hexagonal, the cradle 21 may comprise a surface corresponding to a portion of the post's hexagonal perimeter, and the grip face 25 may correspond to a portion of the post's hexagonal perimeter.

The cradle 21 and the grip section 23 form a hollow tube, wherein the longitudinal axis of the hollow tube extends vertically.

In use, one end of the post 19 may be arranged in the hollow tube. The post 19 and post socket together provide a system for securing a post.

A lever arm 29 may be seen between the grip section 23 and the back wall 7. The lever arm 29 is an elongate bar having a U-shape cross section in a plane perpendicular to the longitudinal axis of the elongate bar. The lever arm 29 comprises a planar face 31, and two lever arm sides 33 extending perpendicularly from the edges of the planar face 31 towards the cradle 21, in use. The lever arm sides 33 are parallel to the grip section sides 27.

In use, the lever arm 29 is pivotally connected to the housing via a first pin 35, wherein the first pin 35 extends horizontally between the sidewalls 3, 5. The lever arm 29 is pivotable relative to the housing, and around the first pivot point. In this way, the lever arm, in use, may rock towards and away from the cradle.

It will be appreciated that other pivoting systems may be employed to rotate the lever arm 29. For example, the lever arm 29 may comprise a flexible portion (not shown), and the flexing of the flexible portion may provide the lever arm's pivotable movement relative to the housing, and around the first pivot point.

The distance between the two grip section sides 27 is shown to be greater than the distance between the two lever arm sides 33. In this way, the grip section 23 is arranged such that the grip section sides 27 overlap the lever arm sides 33, in use. The two lever arm sides 33 are therefore arranged within the two grip section sides 27. However, other arrangements are contemplated.

Each of the two grip section sides 27 and the two lever arm sides 33 are shown to have apertures 37 extending through the centre point of each side 27, 33. The centre of the apertures 37 defines the second pivot point. However, other locations of the apertures 37 through the sides 27, 33 are also contemplated.

A second pin 39 extends through the apertures 37, thereby enabling the grip section 23 to rotate relative to the lever arm 29 around the second pivot point.

Figure 2:
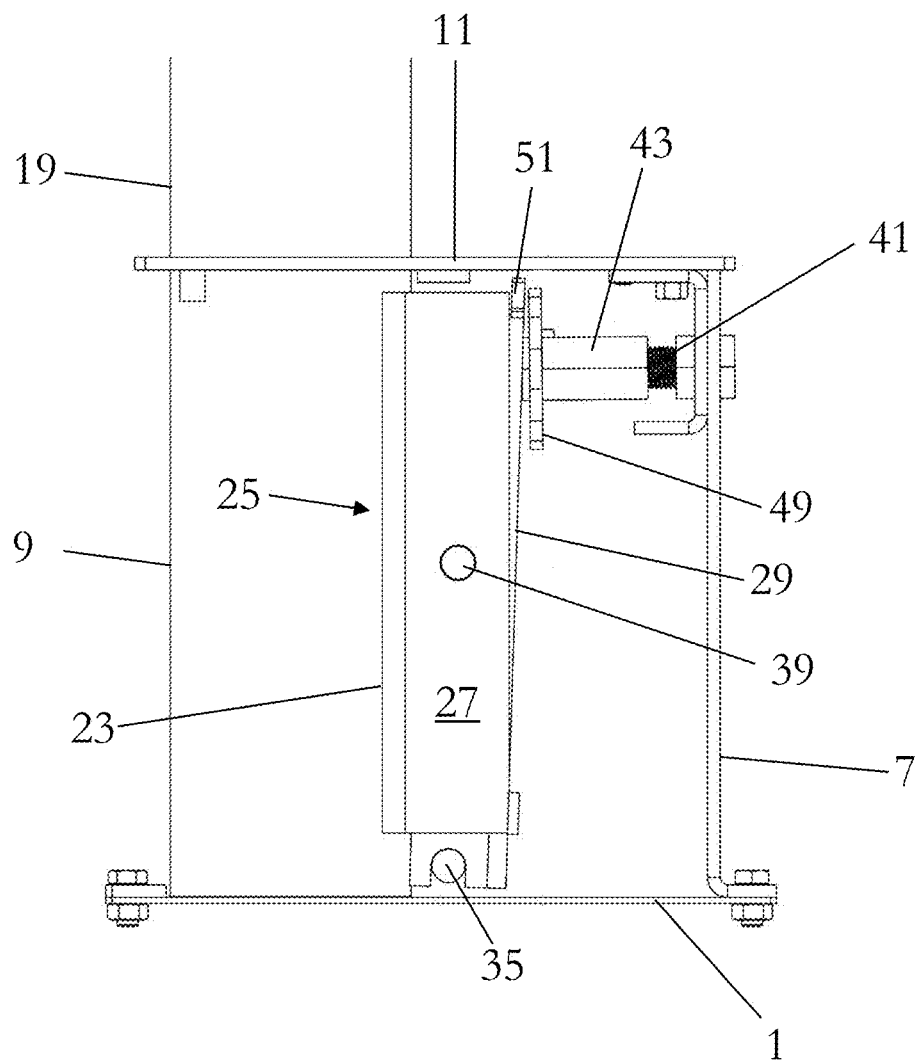
FIG. 2 is an elevational view of the side of a post socket with the grip section in a first grip position.
Figure 3:
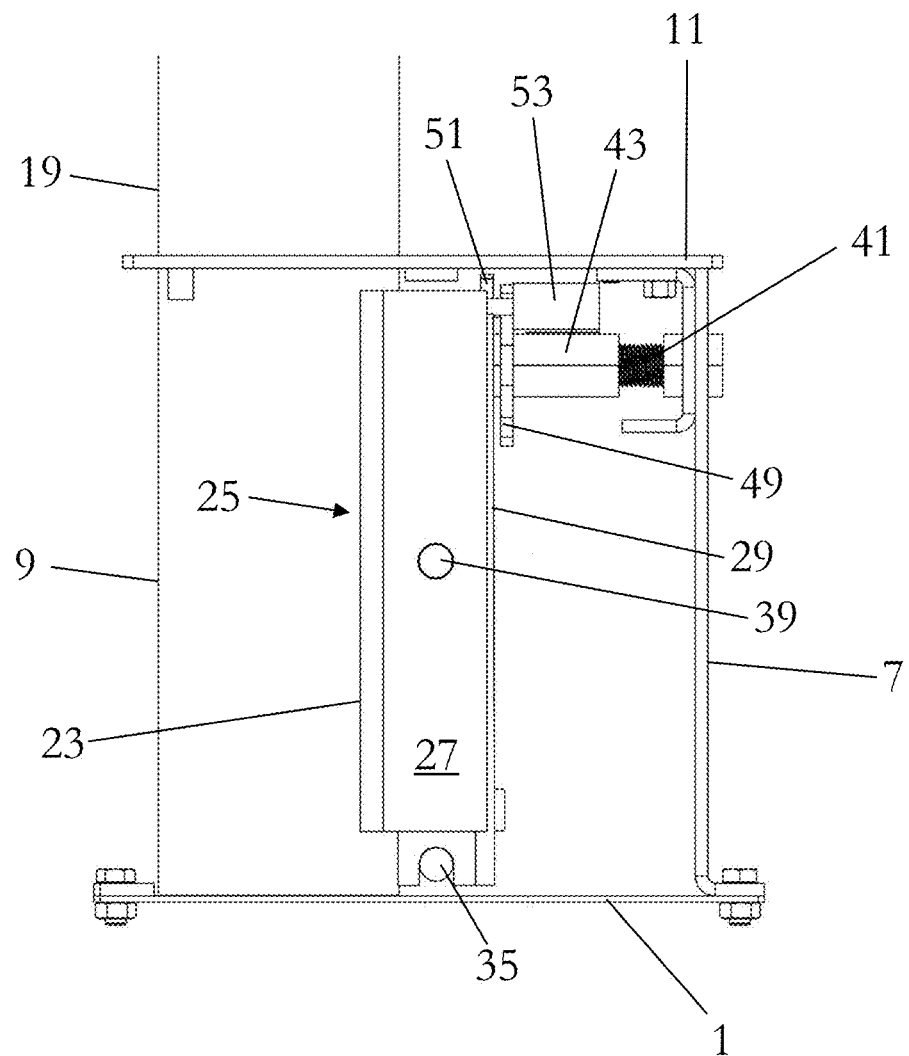
FIG. 3 is an elevational view of the side of a post socket with the grip section in a second grip position.

FIG. 1 further shows a projection comprising a first bolt 41. When the post socket is assembled, the first bolt 41 extends from the back wall 7 and into the hollow interior of the housing, as shown in FIGS. 2 and 3. The first bolt 41 may be secured to the back wall 7 such that rotation of the first bolt 41 is prevented. An elongate nut 43 is also shown, and in use is attachable to the first bolt 41 such that the thread of the elongate nut 43 engages with a thread of the first bolt 41. This engagement is shown in FIGS. 2 and 3.

A stop in the form of a second bolt 45 is shown. In use, the second bolt 45 is attachable to an end of the elongate nut 43 opposite to the end of the elongate nut 43 engageable with the first bolt 41. The second bolt 45 is threaded, and arranged to engage with the thread of the elongate nut 43. In use, the second bolt 45 extends through a hole within the planar face 31 of the lever arm 29. As such, the stop extends from the lever arm 29 towards the front wall 9. To prevent rotation of the second bolt 45 relative to the elongate nut 43, a grub screw 47 is screwable into the side of the elongate nut 43, such that it clamps the second bolt 45 in position. In use, movement of the elongate nut 43 towards the front wall 9 also moves the stop towards the front wall 9. It follows that movement of the elongate nut 43 towards the back wall 7 also moves the stop towards the back wall 7.

A locking mechanism is also shown. The locking mechanism includes a plate 49 comprising a central hole having a size and shape corresponding to the cross-sectional shape of the elongate nut 43 is shown. In use, the plate 49 is arranged around the elongate nut 43, as shown in FIG. 3. In this instance, the shape of the central hole is hexagonal because the cross-sectional shape of the elongate nut 43 is hexagonal. The plate 49 further comprises a plurality of secondary holes located around the edges of the plate, and the lever arm 29 further includes a loop 51 located on the distal end of the lever arm 29. In use, a shackle of a padlock 53 may be passed through a secondary hole of the plate 49 and the loop 51, thereby preventing relative rotation of the elongate nut 43 and the lever arm 29, as shown in FIG. 3. In this way, unauthorised removal of the post may be prevented, because the elongate nut 43 cannot be rotated.

FIG. 2 is an elevational view of the side of a post socket of FIG. 1 in an assembled form. The lever arm 29 is in the retracted position, and the grip section 23 is in a first grip position. The front wall 9 is on the left of the page, the back wall 7 is on the right of the page, and the base plate 1 is at the bottom of the page. The side wall 3 is not depicted, to show the internal working of the post socket. The lever arm 29 is rotated away from the front wall 9 in a clockwise direction around the first pin 35, wherein the first pin 35 is located above and adjacent to the base plate 1. The grip section 23 is located to the right of the front wall 9. In this way, the width of the hollow tube formed by the front wall 9 and the grip section 23 is wide enough for a post 19 to be inserted therein.

The longitudinal axis of the grip section 23 is vertical, with respect to the base plate 1. The grip section 23 is rotatable around the second pin 39 located at the centre point of the grip section 23. The longitudinal axis of the grip section 23 subtends an angle of approximately 5 to 10 degrees with the longitudinal axis of the lever arm 29. However, it will be appreciated that the rotation may be more or less than 5 to 10 degrees.

A post 19 is shown inserted in the hollow tube formed by the front wall 9 and the grip section 23.

The first bolt 41 extends from the top of the back wall 7 horizontally towards the front wall 9. The elongate nut 43 is located on the first bolt 41. The elongate nut 43 is substantially adjacent, but to the left of, the back wall 7.

The second bolt 45 is not shown in FIG. 2, however it will be appreciated from FIG. 1 that because in use the second bolt 45 is attachable to the elongate nut 43, the second bold 45 will move to the left away from the back wall 7 as the elongate nut 43 moves away from the back wall 7.

FIG. 3 is an elevational view of the side of a post socket of FIG. 1 in an assembled form. The lever arm 29 is in the engaged position, and the grip section 23 is in a second grip position. The front wall 9 is on the left of the page, the back wall 7 is on the right of the page, and the base plate 1 is at the bottom of the page. The side wall 3 is not depicted to show the internal working of the post socket.

The elongate nut 43 is located further along the first bolt 41 to the left, relative to the back wall 7, than the elongate nut 43 in FIG. 2. This is because, due to the threaded connection of the first bolt 41 and the elongate nut 43, rotation of the elongate nut 43 has moved the elongate nut 43 along the first bolt 41 away from the back wall 7 and towards the front wall 9.

In comparison to FIG. 2, the lever arm 29 has rotated towards the front wall 9 in an anti-clockwise direction around the first pin 35, such that it is substantially vertical, and its longitudinal axis is substantially parallel to the longitudinal axis of the grip section 23. This is because the elongate nut 43 has pushed the lever arm 29 towards the front wall 9, such that the lever arm has rotated around the first pin 35. This in turn has moved the grip section 23 closer towards the front wall 9 such that the grip section 23 is located to the right of the front wall 9, but closer to the wall 9 than the grip section 23 shown in FIG. 2. In this way, the width of the hollow tube formed by the front wall 9 and the grip section 23 has narrowed, compared to the width of the hollow tube in FIG. 2.

In FIG. 3, the grip section 23 is now in contact with the post 19, thereby clamping the post 19 between the grip section 23 and the front wall 9. As such, the post 19 is gripped and secured within the post socket.

The longitudinal axis of the grip section 23 is vertical, and parallel to the longitudinal axis of the post 19. This is because the grip face 25 of the grip section 23 has been pressed against the surface of the post 19, such that relative rotation between the grip section 23 and the post 19 is prevented. It will be appreciated that if the post 19 was not present, the grip section would hang freely from the second pin 39, such that its longitudinal axis would not necessarily be vertical with respect to the base plate 1.

The second bolt 45 is not shown in FIG. 3, however it will be appreciated from FIG. 1 that because in use the second bolt 45 is attachable to the elongate nut 43, as the elongate nut 43 moves away from the back wall 7 to the left, the second bolt 45 will also move away from the back wall 7 to the left. In this way, it is intended that the second bolt 45 will have abutted the right-hand side of the grip section 23 once the elongate nut 43 has travelled a predetermined distance from the back wall 7 along the first bolt 41. The predetermined distance may equate to a desired force being applied by the grip section 23 to the post 19. In use, this will prevent further rotation of the lever arm 29 around the first pin 35, thereby preventing an excessive force being applied to the post 19.

In use, a user may ensure that the lever arm 23 is in the retracted position, before inserting a post 45 within the compressible sleeve between the cradle 21 and the grip section 23. The user may also rotate the second bolt 45 (i.e., the stop) within the elongate nut 43 until the second bolt 45 extends a desired length from the lever arm 29, and/or from the elongate nut 43. In this way, the user may define a maximum distance that the elongate nut 43 may travel away from the back wall 7, which may correspond to a maximum force being applied to the post 19. This may reduce the risk of damaging the post by applying too great a force. Alternatively, the length the stop extends from the lever arm 29 and/or from the elongate nut 43 may be pre-set during manufacture.

The user may then rotate the elongate nut 43 with a spanner, such that the elongate nut 43 moves along the first bolt 41 towards the distal end of the lever arm 29. In this way, the elongate nut 43 rotates the lever arm 29 around the first pin 35 towards the front wall 9, until the grip section 23 presses against the post 19, and the second bolt 45 abuts the grip section 23. Before the second bolt 45 abuts the grip section 23, a 2:1 mechanical advantage may be obtained because the force is applied to the post 19 through the midpoint of the lever arm 29. At the point the second bolt 45 abuts the grip section 23, the ratio may become 1:1, because the force is applied to the post 19 along the rotational axis of the elongate nut 43. This reduced mechanical advantage may be felt by a user as they will feel a greater resistance when rotating the elongate nut 43, and this may indicate that a sufficient clamping force has been applied.

At the same time, during rotation of the lever arm 29, the grip section 23 presses against the post 19, and consequently rotates around the second pin 39 relative to the lever arm 29 such that the longitudinal axis of the grip section 23 remains parallel to the longitudinal axis of the post 19. In this way, an even pressure across the length of the grip section 23 is provided, and the post 19 is securely retained in the post socket.

To remove the post 19 from the post socket, a user may rotate the elongate nut 43 in the opposite direction, such that the elongate nut 43 moves along the first bolt 41 away from the lever arm 29 and towards the back wall 7. This in turn moves the grip section 23 away from the front wall 9, thereby increasing the width of the hollow tube formed by the front wall 9 and the grip section 23. Once a sufficient width has been obtained, the post 19 may be removed vertically out of the compressible sleeve.

Figure 4:
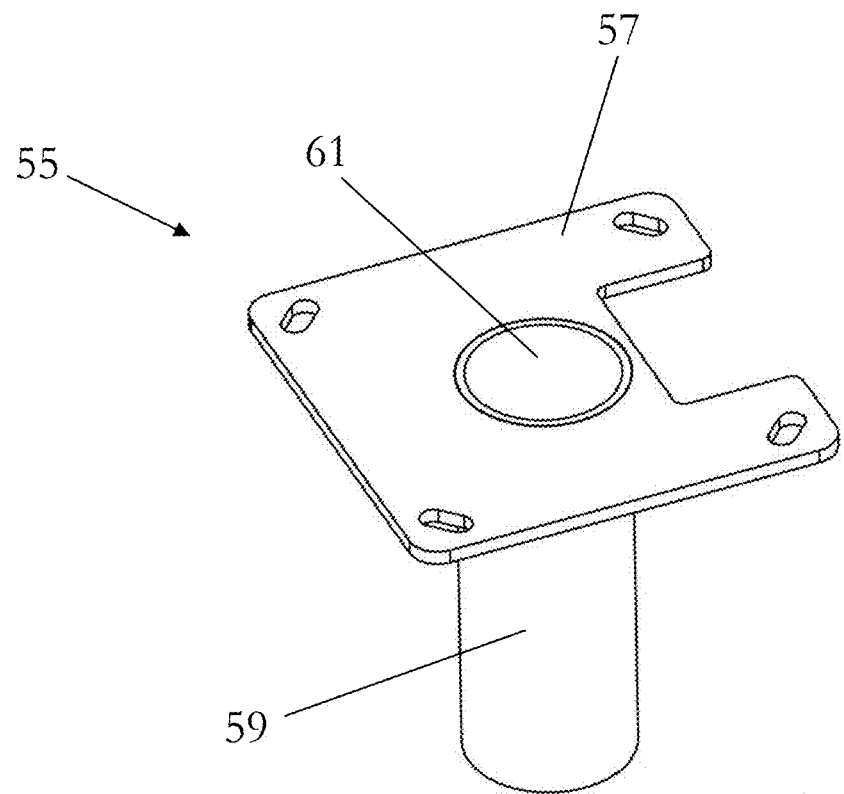
FIG. 4 is a perspective view of a support bracket for use with a post socket.

FIG. 4 is a perspective view of a support bracket 55 which may be used, for example, for securing an electric vehicle charging cabinet (not shown). Alternatively, other articles, such as articles of street furniture may be attached to this plate. The support bracket 55 may be secured in the compressible sleeve of the post socket of FIGS. 1 to 3 as an alternative to the post 19. The support bracket comprises a support plate 57, from which a post section 59 extends perpendicularly.

In use, the support bracket 55 is orientated such that the post section 59 is arranged vertically, and the support plate 57 is arranged horizontally above the post section 59. The support bracket 55 is attachable to the post socket by inserting the post section 59 vertically down into the compressible sleeve. Once inserted, the support plate 55 may be substantially flush with the lid 11. The compressible sleeve may then be actuated as described above to clamp or release the post section 59.

The post section 59 is a hollow pipe. A first cable orifice 61 extends through the centre point of the support plate 55. The longitudinal axis of the post section 59 extends through the centre point of the first cable orifice 61. FIG. 1 shows a second cable orifice 63 extending through the base plate 1.

When the post socket of FIG. 1 is assembled, the longitudinal axis of the compressible sleeve is arranged to extend through the centre point of the second cable orifice 63.

In use, cables (not shown) associated with an electric vehicle charging cabinet may extend from the electric vehicle charging cabinet (not shown), through the orifice 61 of the support plate 57, through the hollow pipe of the post section 59, and through the second cable orifice 63. The cables may then pass through a duct (not shown), and connect to an external electrical energy supply (not shown).

As such, the post socket may further be used to install and/or remove a support bracket for an electric vehicle charging cabinet.

The invention claimed is:

1. A post socket comprising:
a housing;
a compressible sleeve within the housing, the sleeve arranged to receive at least a portion of a post therein, wherein the sleeve comprises a grip section, the grip section being adjustably moveable between a first grip position in which the sleeve has a first internal width and a second grip position in which the sleeve has a second internal width, the second internal width being less than the first internal width;
a lever arm rotatably attached to the housing at a first pivot point, the lever arm configured to rotate in a working plane, the working plane extending radially from and coplanar with the compressible sleeve's longitudinal axis; and
an actuator configured to rotate the lever arm around the first pivot point;
wherein the grip section is rotatably attached to the lever arm at a second pivot point, the lever arm arranged to move the grip section, from the first grip position to the second grip position, to grip and thus retain at least a portion of a post within the sleeve.

2. The post socket of claim 1, wherein the actuator comprises a projection extending from the housing, and an operator moveable relative to the projection, wherein the operator is movable in a first direction to rotate the lever arm around the first pivot point from a retracted position to an engaged position.

3. The post socket of claim 2, wherein, when the lever arm is in the retracted position the grip section is in the first grip position, and when the lever arm is in the engaged position the grip section is in the second grip position.

4. The post socket of claim 1, comprising a stop either extending from the lever arm towards the grip section, or extending from the grip section towards the lever arm, wherein, in use, with the stop being in contact with the lever arm and the grip section, further rotation of the grip section relative to the lever arm around the second pivot point is prevented with the grip section in contact with a post inserted within the compressible sleeve.

5. The post socket of claim 4, wherein the stop is extendable and/or retractable relative to the grip section and/or lever arm.

6. The post socket of claim 4, wherein the stop is extendable through an aperture within the lever arm.

7. The post socket of claim 1, wherein the grip section is rotatable around the second pivot point such that, in use when a post is received within the compressible sleeve, an angle between the grip section's longitudinal axis and the post's longitudinal axis remains constant during movement of the grip section from the first grip position to the second grip position.

8. The post socket of claim 1, wherein the grip section comprises a concave surface, and two grip section sides extending away from the concave surface in a direction parallel to the working plane.

9. The post socket of claim 8, wherein the lever arm comprises a planar face perpendicular to the working plane, and two lever arm sides extending away from the planar face in a direction parallel to the working plane.

10. The post socket of claim 9, wherein the two grip section sides overlap the two lever arm sides.

11. The post socket of claim 10, wherein the rotational axis of the second pivot point extends through the two grip section sides and the two lever arm sides.

12. The post socket of claim 1, wherein the actuator comprises a locking mechanism configured to prevent actuation of the actuator when the locking mechanism is in a locked state.

13. The post socket of claim 1, wherein the compressible sleeve comprises a cradle stationary relative to the housing, the cradle having a concave face opposed to the grip section.

14. The post socket of claim 13, wherein the cradle is a section of the housing.

15. The post socket of claim 1, wherein the post socket comprises a support bracket, the support bracket comprising a support plate, and a post section extending perpendicularly from the support plate, wherein, in use, the post section of the bracket is arranged to be securable within the compressible sleeve of the post socket.

16. The post socket of claim 1, wherein a duct is attachable to the housing such that an opening of the duct is arranged concentrically with the longitudinal axis of the compressible sleeve.

17. A method of installing a post, the method comprising the steps of:

providing the post socket of claim 1, with the grip section configured to be in the first grip position;

inserting a post within the compressible sleeve;

operating the actuator to rotate the lever arm around the first pivot point such that the grip section moves to the second grip position, thereby reducing the width of the compressible sleeve, and securing the post within the post socket.

18. A system for securing a post, the system comprising:
a post; and
a post socket comprising:
a housing;
a compressible sleeve within the housing, the sleeve arranged to receive at least a portion of the post therein, wherein the sleeve comprises a grip section, the grip section being adjustably moveable between a first grip position in which the sleeve has a first internal width and a second grip position in which the sleeve has a second internal width, the second internal width being less than the first internal width;
a lever arm rotatably attached to the housing at a first pivot point, the lever arm configured to rotate in a working plane, the working plane extending radially from and coplanar with the compressible sleeve's longitudinal axis; and
an actuator configured to rotate the lever arm around the first pivot point; wherein the grip section is rotatably attached to the lever arm at a second pivot point, the lever arm arranged to move the grip section, from the first grip position to the second grip position, to grip and thus retain at least a portion of the post within the sleeve.

* * * * *